United States Patent
Matsui et al.

(10) Patent No.: US 6,945,860 B2
(45) Date of Patent: Sep. 20, 2005

(54) APPARATUS FOR AND METHOD OF MACHINING OF OPTICAL CONNECTOR END

(75) Inventors: Shinsuke Matsui, Machida (JP); Yoshiyuki Ishikawa, Kiyose (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 10/694,421

(22) Filed: Oct. 27, 2003

(65) Prior Publication Data

US 2004/0086251 A1 May 6, 2004

(30) Foreign Application Priority Data

Oct. 28, 2002 (JP) .................................... P2002-312099

(51) Int. Cl.$^7$ ............................................... B24B 7/00
(52) U.S. Cl. ...................................... 451/271; 451/270
(58) Field of Search ........................ 451/54, 270, 271, 451/135, 211, 437, 440

(56) References Cited

U.S. PATENT DOCUMENTS

| | | | |
|---|---|---|---|
| 4,979,334 A | 12/1990 | Takahashi | |
| 5,107,627 A | 4/1992 | Mock, Jr. et al. | |
| 5,464,361 A | 11/1995 | Suzuki et al. | |
| 5,497,443 A | 3/1996 | Jie et al. | |
| 5,516,328 A * | 5/1996 | Kawada | ....................... 451/259 |
| 6,186,871 B1 * | 2/2001 | Crocker et al. | ................ 451/41 |
| 6,582,286 B2 * | 6/2003 | Minami et al. | ............. 451/270 |
| 6,736,551 B2 * | 5/2004 | Arai et al. | ..................... 385/85 |

FOREIGN PATENT DOCUMENTS

| | | |
|---|---|---|
| EP | 0 352 709 A2 | 1/1990 |
| EP | 1 027 957 A2 | 8/2000 |
| GB | 231573 | 3/1925 |
| GB | 310301 | 4/1929 |
| JP | 06-015556 | 1/1994 |
| JP | 06-027330 | 2/1994 |
| JP | 2002-018691 | 1/2002 |

* cited by examiner

*Primary Examiner*—Dung Van Nguyen
(74) *Attorney, Agent, or Firm*—Brenda O. Holmes; Kilpatrick Stockton LLP

(57) ABSTRACT

An optical connector machining apparatus (500) is comprised of an operation circuit box (1) containing a drive motor (9) and a battery (10) while serving as a grasping section, and a planetary gear mechanism box (2) having a drive mechanism (8) that rotatably holds a polishing table (4) with a polishing table retainer (3) while permitting rotation of the drive motor to be delivered to the polishing table retainer through a planetary gear mechanism, wherein a chuck mounting section (5) is fixedly secured to the planetary gear mechanism box through two pieces of columns (6, 6), and a chuck (43), slidably guiding a ferrule (A) with respect to the polishing table in a vertical direction, and a pressure-applying mechanism (7) for urging the ferrule to the polishing table in a vertical direction, are mounted to the chuck mounting section.

12 Claims, 8 Drawing Sheets

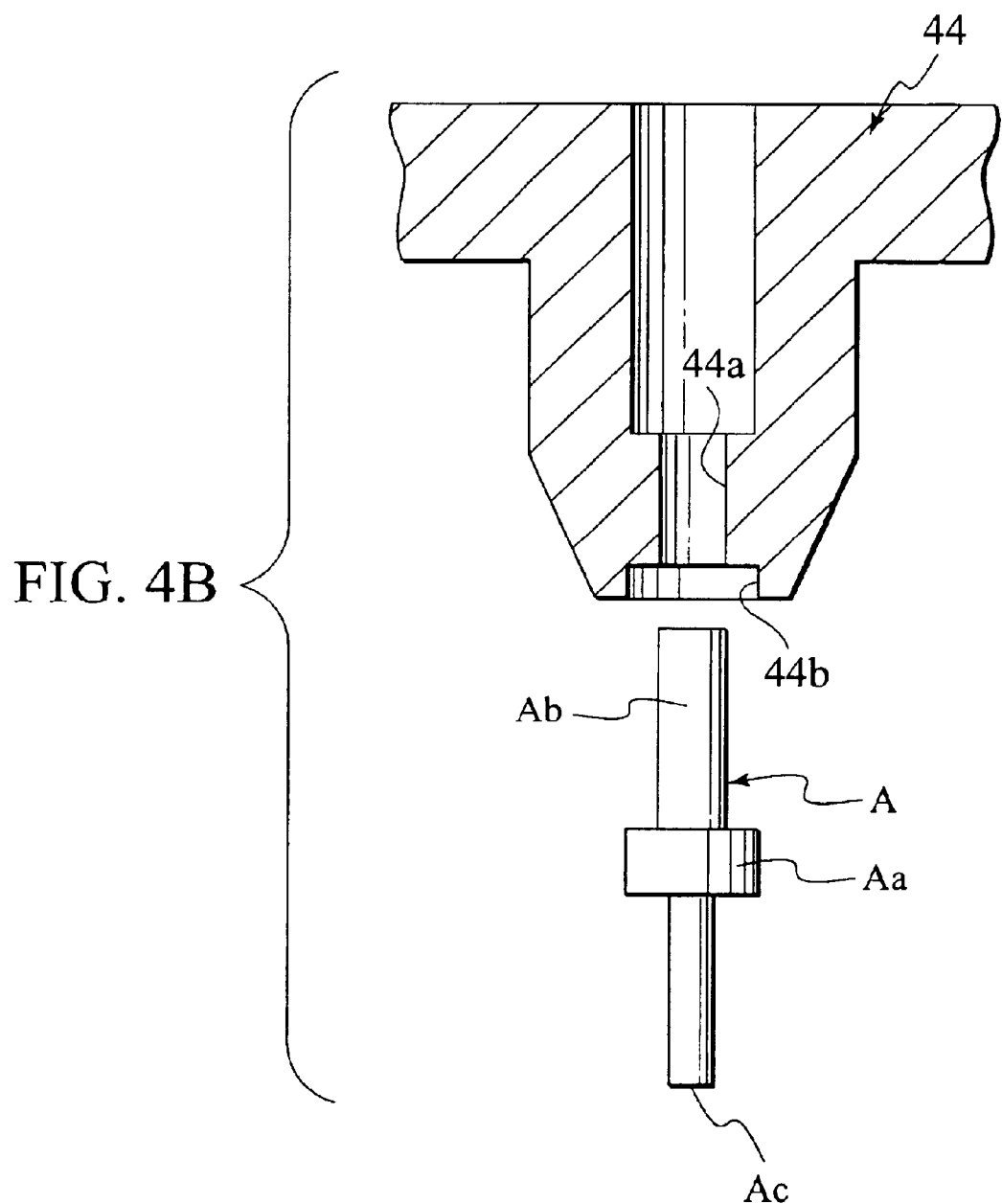

APPARATUS FOR AND METHOD OF MACHINING OF OPTICAL CONNECTOR END

CROSS REFERENCE TO RELATED APPLICATIONS

This application is based upon and claims the benefit of priority from the prior Japanese Patent Application No. P2002-312099, filed on Oct. 28, 2002; the entire contents of which is incorporated herein by reference.

BACKGROUND OF THE INVENTION

1. Field of the Invention

The present invention relates to an apparatus for and method of machining ferrule end face serving as an optical connector end. More particularly, the present invention relates to a method of high speed machining of a ferrule end face for polishing the ferrule end face in a simple manner at a high speed under various situations in various locations. Further, the present invention relates to a polishing machine, which is small in size and light in weight and available to be used at a reduced electric power consumption, for realizing the high speed end face machining method for the ferrule.

In the present invention, an applicable polish object mainly comprises a 1.25 mm diameter ferrule, which has a small polishing surface area. Additionally, it is possible to achieve more higher-density interconnections by using the 1.25 mm diameter ferrule.

2. Description of the Related Art

FIGS. 1A to 1D show pre-treatments of the related art ferrule end face polishing process and typically show working strokes between fiber bonding and surface alignment between the fiber and the ferrule.

Firstly, as shown in FIG. 1A, a fiber 200 is inserted through and bonded to a ferrule 100, and the fiber 200 protrudes from a polishing objective end face G of the ferrule 100. In this process, the adhesive is applied to the polishing objective end face G of the ferrule 100, thereby forming an adhesive layer 300. Also, although a thickness of the adhesive layer 300 depends on the diameter of the ferrule 100, it is to be noted that the smaller the diameter of the ferrule 100, the more difficult will be the bonding work to be performed in an accurate fashion.

Then, as shown in FIG. 1B, a protruding portion 200a of the fiber 200 is cut at a position near the adhesive layer 300 by hand work.

During this work, an end of the fiber 200 tends to protrude to some extent in the order of 0.1 mm in distance from the adhesive layer 300.

Under such a condition, polishing is progressively performed (shown in FIG. 1C) to perform machining to allow the polishing objective end face G of the ferrule 100 to line on the same plane as a polishing objective end face 200b of the fiber 200 (as shown in FIG. 1D). This step is termed adhesive removing step or first step. The fiber 200 is protected with the adhesive layer 300 during first step.

Conventionally, in order to achieve a remarkable amount of processing in a short time period during first step using a polishing film (not shown) with a relatively large grain size. For this reason, during an initial stage of processing of first step, a concentrated force applies to the protruding portion 200a of the fiber 200, thereby a part of the fiber 200 is bent with a bent end being folded into the adhesive layer 300. However, due to the presence of the adhesive layer 300, no probability occurs where such a folded piece reaches the ferrule 100, and the folded piece remains in the adhesive layer 300.

After first step has been terminated, the polishing objective end face 200b of the fiber 200 lies on the same plane as the polishing objective end face G of the ferrule 100. That is, the adhesive layer 300 plays a role to protect a distal end (the polishing objective end face 200b) of the fiber 200 during processing.

Also, the polishing objective end face 200b of the fiber 200 lies on the substantially same plane as the polishing objective end face G of the ferrule 100, and serves as a surface suited for subsequent polishing process (not shown). Since, in general, the surface resulted by processing in first step is polished with the relatively coarse abrasive grain, the resulting surface has a coarse grade to some extent.

After first step, the end face is processed in a convex spherical shape (in coarse processing step, i.e., second step) and finishing (third step) is performed for the purpose of enhancing a return loss and suppressing intrusion of the fiber.

The connector end face (now shown) resulting from the process up to third step has a cross sectional shape formed in a convex spherical surface with a radius of curvature falling in a range of approximately 10 mm to 25 mm. Also, it is required for the optical connector end face to have a process precision that is required to fall in a deviation between an apex of the convex sphere and a center of the fiber 200 at a value less than 50 $\mu$m while the amount of intrusion of the fiber 200 with respect to the ferrule falls in a range of 0.05 $\mu$m to 0.1 $\mu$m. In case of a small size ferrule such as Type MU connector, it is difficult to machine the ferrule so as to satisfy the above-described conditions in respect of the amount of deviation between the apex of the convex sphere and the center of the fiber 200.

Major factors for difficulties are attributed to 1) a probability where, in case of a small size ferrule, an adhesive coating surface, that is, the polishing objective end face G of the ferrule 100, are extremely small in area whereby adhesive spreads over a ferrule tapered surface 100a shown in FIGS. 1A, and 2) another probability where, if adhesive spreads over the other area, such as the ferrule tapered surface 100a, than the polishing objective end face G of the ferrule 100, the center of the polishing objective end face G is displaced from the center of the fiber 200 whereby decentering takes place in the related art maching method where the convex spherical surface is formed using rubber resilient deformation of a polishing table.

Further, with the ferrule 100 such as type MU ferrule, when machining the ferrule 100 so as to realize a curvature of the convex sphere surface that satisfies a specification, a difference in an amount, that has been processed, between a central portion and an outer peripheral part of the ferrule is minute with a resultant ease of occurrence of decentering. For this reason, in general, a high precision polishing machine is needed.

An apparatus for performing such high precision machining is required to trace an idealistic moving orbit and has a moving precision of the apparatus. An idealistic orbit is drawn in a case where the moving orbit of the polishing table describes a perfect circle with respect to the polishing objective end face of the optical connector (ferrule). In such a case, it is possible to obtain an optical connector with a desired polishing objective end face.

The polishing table is made of a resiliently deformable member, and the polishing table is configured to resiliently deform in case the polishing objective end faces of the ferrule and the fiber are brought into contact with the polishing table, deformation occurs in an area in which the polishing table is brought into contact with the polishing objective end faces. Rotating the polishing table under such a condition, a convex spherical surface is formed. When this takes place, if processing is performed on the idealistic moving orbit, a processing pressure distribution, caused by rubber resilient deformation resulting from the ferrule end face and the fiber being indented into the polishing table, is uniform, with resultant formation of convex sphere surfaces with less degree of decentering.

With an actual polishing machine, a position in which the ferrule is mounted is preliminarily fixed, and the polishing table revolves and draw a perfect circular orbit about a center of the position that is separated from the fixed position of the ferrule by a given displacement value.

However, when attempting to performing polishing through only revolving motion of the polishing table, only an identical single point of the polishing film on the polishing table is used and a polishing capability of the relevant area becomes lower than that of the other area of the polishing film. Replacement of the polishing film with a largely remaining non-used area arises an issue to be of non-economic.

Therefore, in order to efficiently use the polishing film, it has been a usual practice for the polishing table to trace the perfect circular orbit while progressively shifting the revolving center.

Thus, in order to realize complex and highly accurate motion of the polishing table, it has been a usual practice for the related art to take a method of using a cam linkage mechanism and a method of using a sliding stage. However, such a related art technology requires a complex rotation and a high power output.

Accordingly, there are many related art machining machines that are large in size and large in weight in each of which batch processing is executed for a large number of ferrules to minimize a work time and cost for each ferrule terminal.

Further, with a conventional polishing machine of a portable type that is light in weight and low in cost, there are many probabilities where the polishing machines are of the type which are insufficient in the polishing orbit with the use of arm's rocking movement with a resultant issue in which the above-described conditions are not satisfied.

It is, therefore, an object of the present invention to provide a machining apparatus that is able to perform polishing work at various locations involving outdoor locations and to perform polishing work in a short time period in an easy fashion at a low cost without a need for particular skills of workers.

SUMMARY OF THE INVENTION

In order to achieve the above object, according to an aspect of the present invention, there is provided an optical connector face end machining apparatus comprising an operation circuit box having a drive motor and a battery and serving as a grasping section, a planetary gear mechanism box including a drive mechanism that rotatably retains a polishing table on a polishing table retainer and permits rotation from the drive motor to be delivered to the polishing table retainer through a planetary gear mechanism, and a chuck mounting section fixedly secured to the planetary gear mechanism section, wherein the chuck mounting section includes a chuck that allows a ferrule to be guided with respect to the polishing table for a sliding capability in a vertical direction, and a pressure-applying mechanism that causes the ferrule to be vertically held in pressured contact with the polishing table.

In order to address the above-described adhesive problem, a method of machining an optical connector end face, using an optical connector end machining apparatus according to the present invention, comprises bonding step applying an adhesive to a circumferential periphery of a fiber at an area except for an end face to be processed and permitting the fiber to be inserted to the ferrule and bonded thereto into the ferrule, cutting step cutting an excessive fiber protruding from an end face of the fiber, and forming step forming a convex spherical surface on the end face of the fiber. In this instance, using the above-described optical connected end machining apparatus, machining is performed to allow the ferrule end face and the fiber end face to lie on the same plane.

As describe above, during cutting step, the excessive fiber is folded and intruded into the end face of the fiber.

Therefore, such a folded and intruded fiber is removed by taking a more processed amount than that removed in a normal practice during forming step.

Here, as the amount of the fiber to be processed, it may be suffice to process the fiber by an amount equal to or greater than a value of approximately 20 to 70 $\mu$m.

With the optical connector machining apparatus of the present invention set forth above, since such processing can be carried out for a relatively short period of time within a time value less than one minute because of, in case of a ferrule with a thin diameter, a small processing surface area and a capability of processing to originally shorten a length of the ferrule at a high speed.

BRIEF DESCRIPTION OF THE DRAWINGS

FIG. 4B is a partial enlarged view of FIG. 4A.

DETAILED DESCRIPTION OF THE PREFERRED INVENTION

Hereinafter, an embodiment of the present invention is described with reference to the drawings.

Figure 1A:
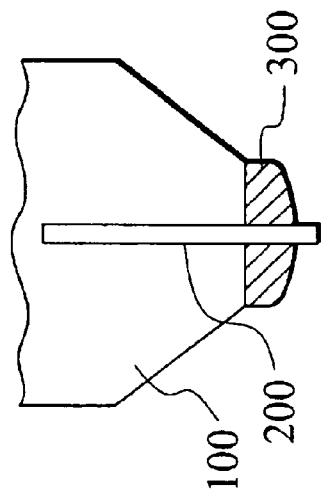
FIG. 1A is a side cross sectional view showing a condition in which, during operation to carry out related art processing for a ferrule end face, a fiber is inserted to a ferrule and bonded thereto.
Figure 1B:
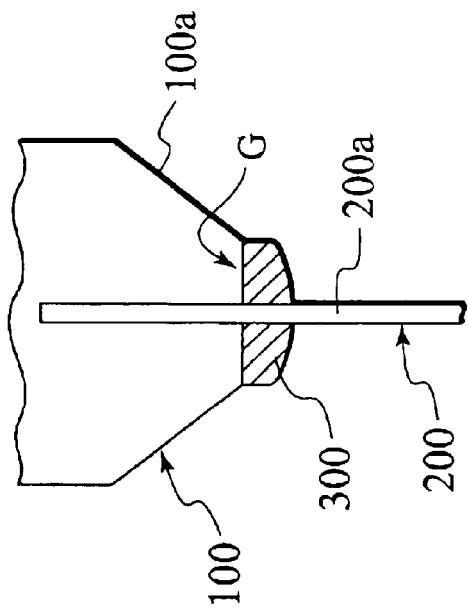
FIG. 1B is a side cross sectional view showing a condition in which the fiber is cut out at an area proximity to an adhesive layer.
Figure 1C:
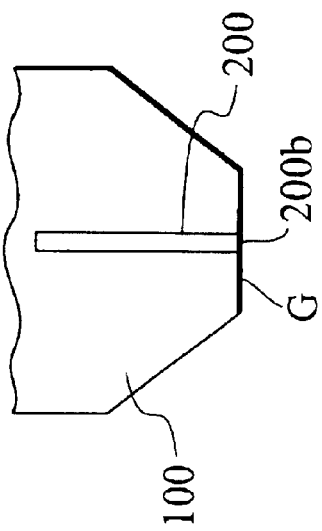
FIG. 1C is a side cross sectional view showing a phase in which the adhesive layer is removed.
Figure 1D:
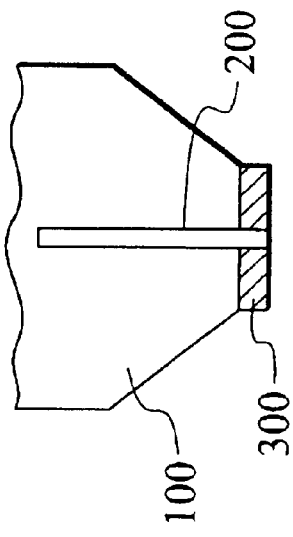
FIG. 1D is a side cross sectional view of the ferrule whose polishing pre-treatment operation has been completed.
Figure 2:
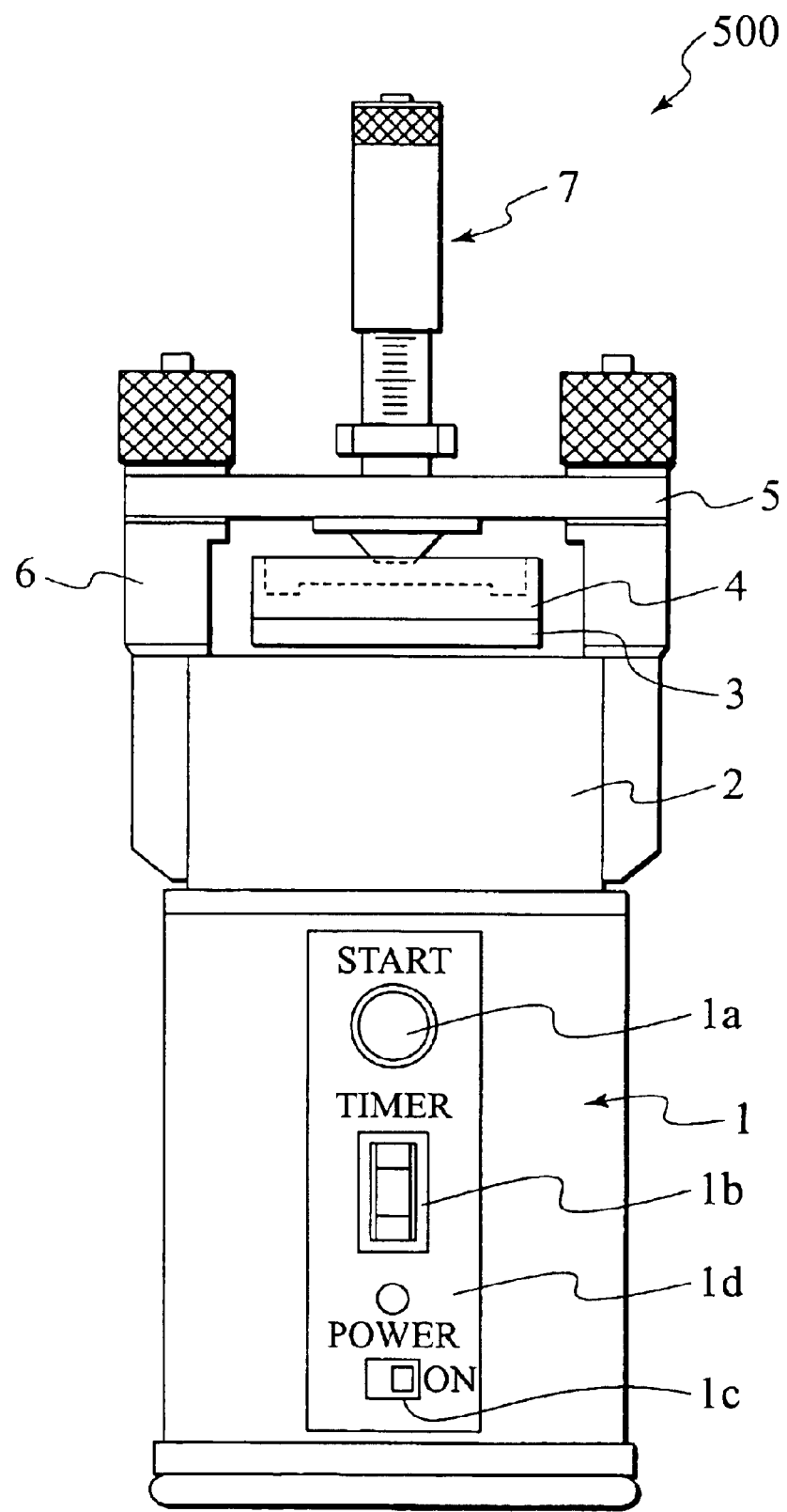
FIG. 2 is an overall front view of an optical connector end polishing apparatus according to the present invention.

As shown in FIG. 2, an optical connector end machining apparatus 500 of the present embodiment is generally comprised of an operation circuit box 1, a planetary gear mechanism box 2, a polishing table retainer 3, a polishing table 4, a chuck mounting—section 5, columns 6 and a pressure-applying mechanism 7.

An operation start switch 1a, a timer switch 1b and a power switch 1c are disposed on a front surface 1d of the operation circuit box 1. In addition, inside the operation circuit box 1, a drive motor 9 and a battery 10 are incorporated (see FIG. 3A). In operation, an operator (not shown) grasps the operation circuit box 1.

The polishing table 4 is rotatably supported on the polishing table retainer 3 by the planetary gear mechanism box 2. Furthermore, the planetary gear mechanism box 2 includes a drive mechanism 8 serving a rotational force exerted by the motor 9 to the polishing table retainer 3 through a planetary gear mechanism.

Figure 3A:
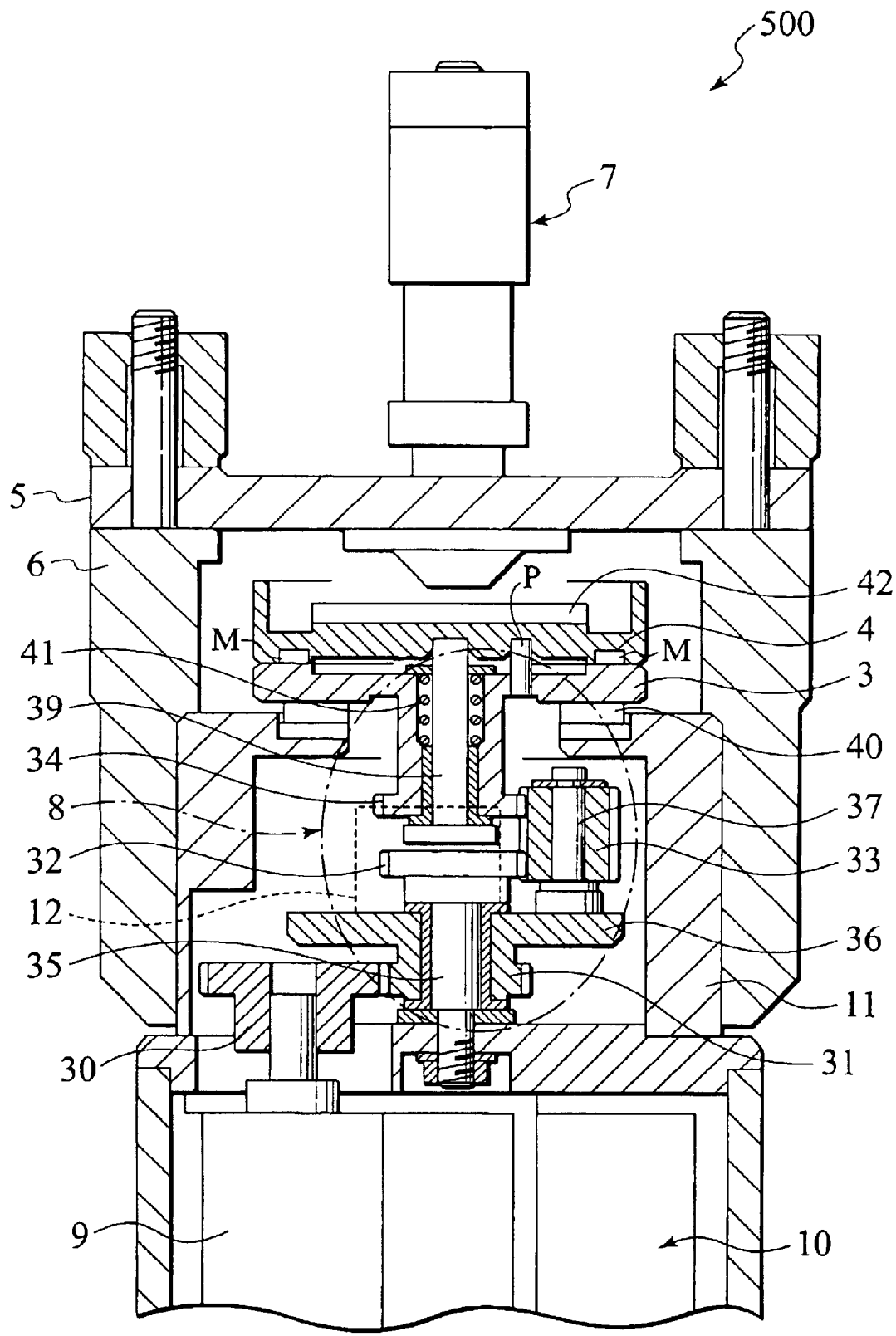
FIG. 3A is a cross sectional view of a drive mechanism of the present invention as viewed from a front thereof.
Figure 4A:
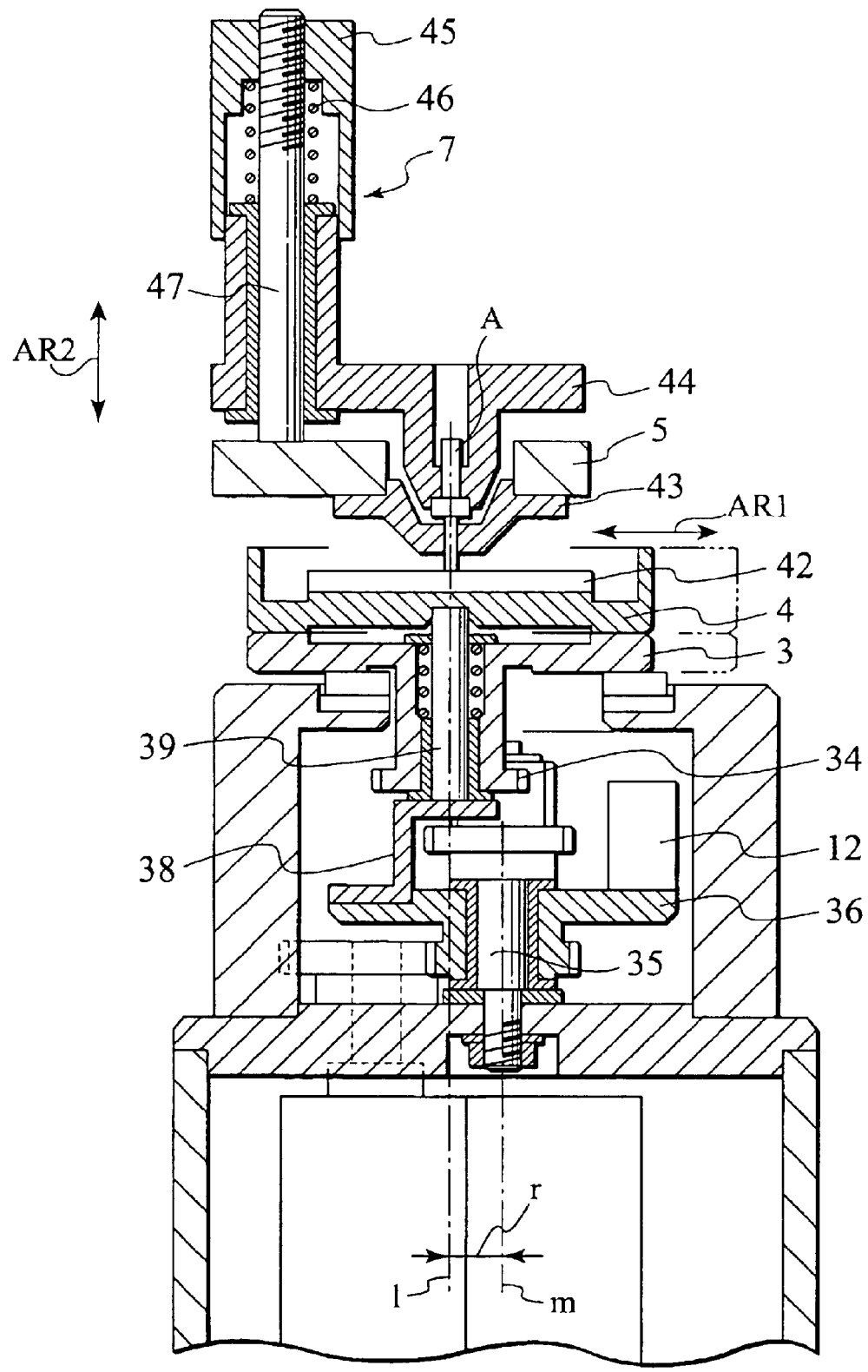
FIG. 4A is a cross sectional view of the drive mechanism and a pressure-applying mechanism as viewed from sides thereof.

As shown in FIGS. 3A and 4A, the planetary gear mechanism of the drive mechanism 8 is composed of a sun gear 32, a first planetary gear 33 and a second planetary gear 34 and render the polishing table 4 and the polishing table retainer 3 rotate and revolve on a surface opposing to the polishing process end face of a ferrule A.

Inside the drive mechanism 8, the sun gear 32 is fixed to a central shaft 35 being erected upwardly on a frame 11, and a rotary bearing gear 31 and a rotary bearing 36 unitarily formed thereon are rotatably attached to the central shaft 35.

Further, a drive gear 30 directly coupled to the drive motor 9 is meshed with the rotary bearing gear 31, and the first planetary gear 33 meshing with the sun gear 32 is rotatably attached to a stationary shaft 37 fixed to the rotary bearing 36.

On the other hand, the second planetary gear 34 meshing with the first planetary gear 33 is rotatably attached to a second planetary gear shaft 39 mounted to the rotary bearing 36 through an arm 38 (see FIG. 4A).

The second planetary gear 34 and the polishing table retainer 3 are unitarily formed, and the polishing table retainer 3 is rotatably supported on the frame 11 of the planetary gear mechanism box 2 by a roller bearing 40 for revolving and rotating capabilities.

The roller bearing 40 supports the polishing table 4 and bears a machining load that occurs during machining. Also, it is possible to smoothly and accurately move and slide the polishing table 4 by using the roller bearing 40. The drive mechanism 8 causes the polishing table 4 and the polishing table retainer 3 to revolve and slide while rotating in a direction AR1 in FIG. 4A. Additionally, the polishing table 4 and the polishing table retainer 3 slides on the roller bearing 40 with a range of a position showing by a solid line in FIG. 4 to a position showing by a double dot line in FIG. 4.

Furthermore, a compression spring 40 is disposed between the second planetary gear shaft 39 and the polishing table retainer 3 for urging the polishing table retainer 3 onto the roller bearing 40, and thereby it is possible to realize a high motional accuracy of the polishing table 4.

That is, for the purpose of causing the polishing table 4 to horizontally slide and rotate at all times with respect to the ferrule A, an elastic force of the compression spring 41 is applied downward in the drawing to the polishing table retainer 3, thereby permitting the polishing table retainer 3 to be continuously held in contact with the roller bearing 40. With this mechanism, the polishing table 4 is horizontally and smoothly rotated at all times with respect to the ferrule A. Further, this mechanism enables a precision of the present embodiment to be increased.

Further, flatness accuracy of a rest section of the roller bearing 40 is finished in an adequate precision, and therefore it is possible to suppress swaying caused by rotation of the polishing table 4.

In addition, if rest sections of the columns 6 for the chuck mounting section 5 and the chuck mounting section 5 are fabricated at a high precision based on a reference formed by a flat surface against which the roller bearing 40 abuts, it is possible to allow the ferrule end face and the polishing table 4 to be held in contact at a high precision without depending on the precision of the drive mechanism 8.

Further, as shown in FIG. 3A, a pin P, standing upright toward the rotary table 4, is provided on the rotary table retainer 3. The pin P is fixedly secured to the rotary table retainer 3 and is held in engagement with an engaging portion (not shown) formed in the rotary table 4. The presence of the pin P allows the rotary table retainer 3 and the rotary table 4 to be unitarily rotated.

Figure 3B:
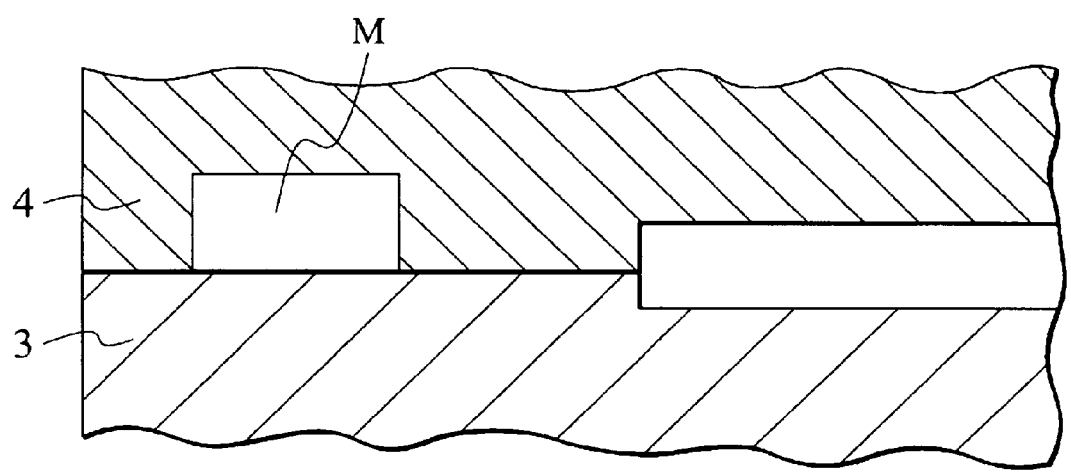
FIG. 3B is a partial enlarged view of FIG. 3A.

In addition, as shown in FIG. 3B, a permanent magnet M may be berried in the polishing table 4. Due to an attraction force acting between the magnet M and the rotary table retainer 3, made of metal, even if the machining apparatus 500 is inclined during working operation, the polishing table 4 can be protected from being dislocated from the rotary table retainer 3.

The chuck mounting section 5 is fixedly secured to the planetary gear mechanism box 2 by means of two columns 6, 6. A chuck 43 guiding the ferrule A in a vertical direction for a sliding capability with respect to the polishing table 4, and a pressure-applying mechanism 7 vertically biasing the ferrule A to the polishing table 4 are mounted on the chuck mounting section 5.

Also, the ferrule A is formed in a cylindrical shape with a diameter in the order of approximately 1.25 mm or 2.5 mm, or in the order of proportionate size.

In the pressure-applying mechanism 7, a guide hook 44, to which a flange Aa (see FIG. 3B) of the ferrule A, is slidably mounted on a guide shaft 47 standing upright on the chuck mounting section 5. Additionally, a pressure-applying adjustment screw 45 is mounted on a top end of the guide shaft 47, and a compression spring 46 is compressed between the pressure-applying adjustment screw 45 and the guide hook 44.

The guide hook 44 is supported by the guide shaft 47, fixedly secured to the chuck mounting section 5, through a low frictional member such as a bearing, and the guide hook 44 is urged toward the polishing table 4 (in a direction as shown by an arrow AR2 in FIG. 4A) by the compression spring 46.

The compression spring 46 is fixed in place by the pressure-applying adjustment screw 45 secured to the guide shaft 47. A compression pressure of the compression spring 46 can be adjusted by adjusting a height of the pressure-applying adjustment screw 45.

Consequently, a polishing pressure for polishing the end face of the ferrule A is created by urging the ferrule A, inserted through the chuck 43, against the polishing table 4 by means of the guide hook 44 as shown in FIG. 4A.

Further, as shown in FIG. 4B, a shield portion Ab of the ferrule A is inserted to a guide recess 44a of the guide hook 44, and a ferrule flange Aa is fixedly secured to a hook end portion 44b of the guide hook 44.

The polishing table 4 is made of material that can be resiliently deformed and has a surface on which a polishing film 42 is affixed. Urging a polishing end face Ac of the ferrule A onto the polishing film 44 of the polishing table 4 with a given pressure force applied by the pressure-applying mechanism 7 allows the ferrule A and a polishing objective end face Fc of a fiber F, preliminarily inserted through the ferrule A along its center and bonded thereto, to be polished on the same plane (see FIGS. 6A to 6E).

FIGS. 6A to 6E are views illustrating a process in which the ferrule A is polished using the machining apparatus 500 according to the present invention set forth above.

Figure 6A:
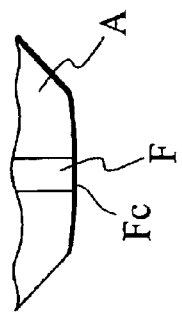
FIG. 6A is a side cross sectional view showing a condition in which, during operation to carry out ferrule end face processing according to the present invention, the fiber is inserted to the ferrule and bonded thereto.
Figure 6B:
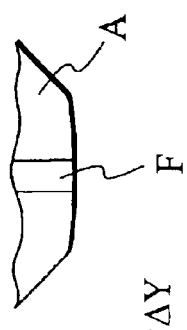
FIG. 6B is a side cross sectional view showing a condition in which the fiber is cut out at an area proximity to a processing objective end face of the ferrule.

First, the fiber F is inserted to the ferrule A and bonded thereto, and an excessive part Fa of the fiber F is cut out (see FIGS. 6A and 6B).

Figure 6C:
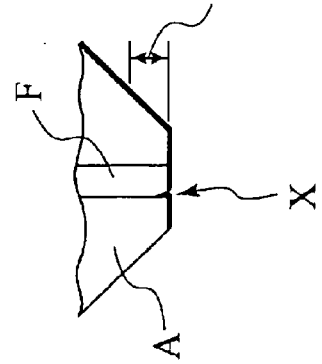
FIG. 6C is a view showing a phase in which a portion of the ferrule is folded and intruded into a ferrule interior.
Figure 6D:
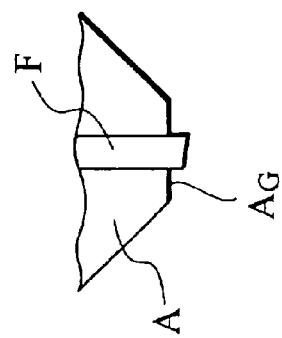
FIG. 6D is a side cross sectional view showing a condition in which the portion of the ferrule is polished.
Figure 6E:
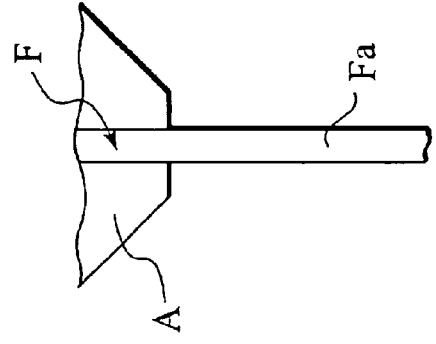
FIG. 6E is a side cross sectional view showing the fiber whose machining has been completed with the optical connector end machining apparatus of the present invention.

Next, the ferrule A is polished and, as set forth above, a portion of the end of the fiber F is folded into the interior of the ferrule A (X in FIG. 6C shows this folded part) (first step). In second step, for the purpose of removing the folded part, a length of ΔY of the ferrule is polished. Also, a value of ΔY is appropriately determined based on an amount of X in which the fiber portion is folded. In consecutive third step, the end face $A_G$ of the ferrule A is aligned on the same plane with the end face Fc of the fiber F, thereby machining at a given precision.

The machining apparatus 500 for the optical connector end face, of the present embodiment with the structure mentioned above, has advantageous operation and effects as described below.

When the drive gear 30 being connected to the drive motor 9 rotates, the rotary bearing gear 31 meshing with the drive gear 30 rotates about the central axis 35. Further, the rotary bearing gear 31 rotates unitarily with the rotary bearing 36, and the first planetary gear 33 rotates about the fixed shaft 37 secured onto the rotary bearing 36 while rotating about and meshing with the sun gear 32 secured to the central axis 35.

When the first planetary gear 33 and the second planetary gear 34 in meshing therewith rotate, the polishing table retainer 3, integral with the second planetary gear 34, and the polishing table 4 revolve. When this takes place, the polishing table retainer 3 is urged toward the frame 11 via the bearing 40 by means of the compression spring 41, and therefore smooth rotations of the polishing table retainer 3 and the polishing table 4 are maintained.

Here, if a difference exists between the number of teeth of the sun gear 32 and the number of teeth of the second planetary gear 34, the second planetary gear 34, the polishing table retainer 3 and the polishing table 4 rotate on their axes and revolve about the center of the central axis 35.

When this takes place, a revolving radius r is equal to a distance between a shaft center m of the central axis 35 and a shaft center 1 of the second planetary gear 39.

Further, if the number of teeth of the sun gear 32 and the number of teeth of the second planetary gear 34 are equal to one another, the second planetary gear 34, the polishing table retainer 3 and the polishing table 4 revolve about the center of the central axis 35 and do not rotate.

Thus, by the presence of difference between the numbers of teeth of the sun gear 32 and the second planetary gear 34, the center of the polishing table 4 not draws a perfect circle orbit. For instance, in case the sun gear 32 has twenty four teeth and the second planetary gear 34 has twenty fifth teeth, respectively, the polishing table 4 rotates once every twenty five revolution thereof.

Figure 5:
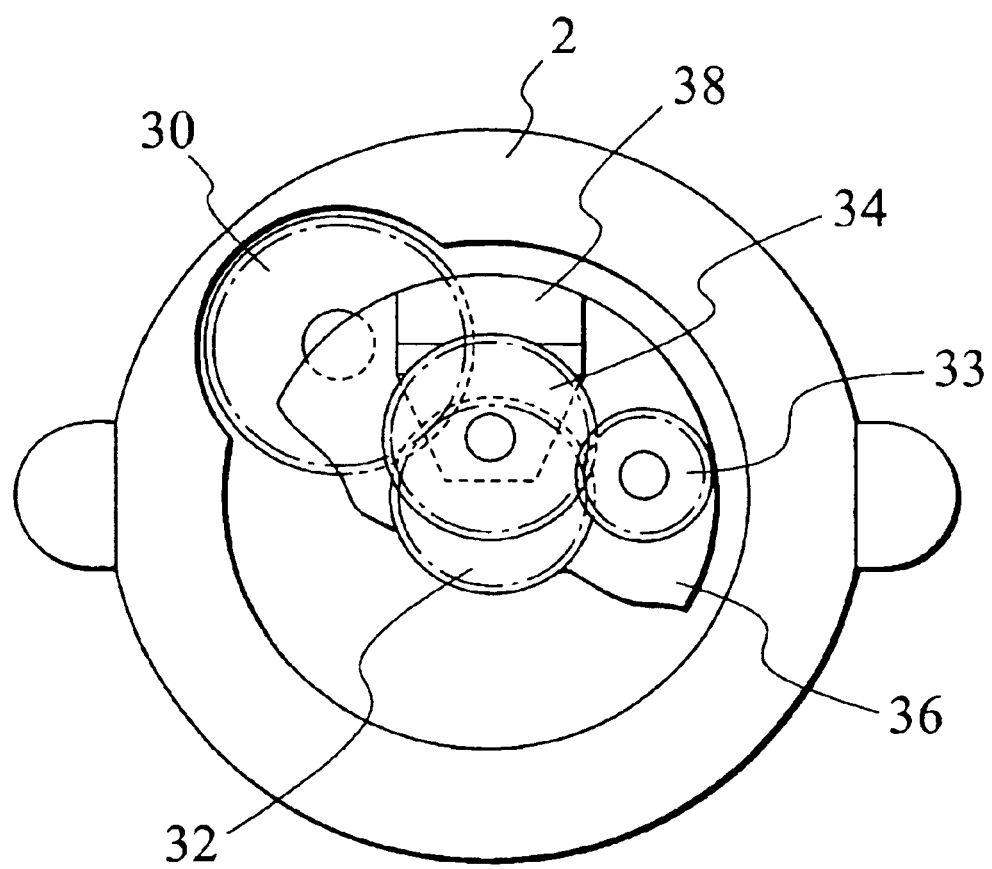
FIG. 5 is a top view of the drive mechanism of the present invention.

In addition, according to the present embodiment, as shown in FIG. 5, the central axes of the sun gear 32, the first planetary gear 33 and the second planetary gear 34 do not lie on a straight line and lie in a multi-layer structure falling in the vicinity of the revolving center 1, enabling the apparatus to be constructed in a smaller structure than that of the related art apparatus.

Moreover, since a counter-weight 12 is disposed on the rotary bearing 36, it also becomes possible for a center of gravity of the revolving motional section to lie on the revolving axis.

Thus, since the optical fiber end face machining apparatus 500 of the present embodiment is constructed of the power transmitting mechanism employing the planetary gear unit, all the motional elements are formed of rotary moving components. Also, the apparatus of the present invention is more compact in structure and lighter in weight than the related art apparatus.

Further, since the gears 32, 33, 34 take the form of a multi-layer structure, an eccentricity in the centers of gravity during revolutions can be minimized and, in addition, the presence of the counter-weight 12 that is relatively light in weight provides a capability of substantially removing the eccentricity.

With these features, it is possible to realize an apparatus that is light in weight and small in structure for enabling the polishing table to revolve at a high speed in a low power.

For instance, the machining apparatus 500 of the present embodiment has a total weight of approximately 0.7 Kg with a height of 170 mm and an outline of 60 mm. Additionally, the apparatus 500 run on a power source incorporating nickel-hydrogen batteries.

Also, it is possible for the rotating mechanism of the polishing table 4 to include a ball bearing in place of the roller bearing 40.

As a result of machining the MU ferrule using the apparatus manufactured with the expedients set forth above, the ferrule could be processed for a processing time interval of approximately one minute and a half. This approximates to a half of the time interval required for a largely sized polishing machine of the related art and reaches a processing time interval that approximates to one third of a small-sized handy polishing machine.

That is, with the present embodiment having the structure mentioned above, it has been achieved for the polishing table to be operated at a higher revolving speed than that attained in the related art apparatus. In addition, in case of the objective to be polished composed of the MU ferrule with a thin diameter ferrule (providing a small processing area), polishing work could be completed within a remarkably short period of time less than that accomplished with the related art polishing apparatus.

Moreover, a high precision machining satisfying a required shape in specification could be realized at a probability of more than 95%, with a resultant improvement in yield.

According to the present invention, the end face machining for the optical fiber connector with the cylindrical ferrule can be performed at a high speed and in an easy fashion even in any place using a small-sized and low cost apparatus.

What is claimed is:

1. An optical connector end face machining apparatus comprising:

an operation circuit box having a drive motor and a battery and serving as a grasping section;

a planetary gear mechanism box including a drive mechanism that rotatably retains a polishing table on a polishing table retainer and permits rotation from the drive motor to be delivered to the polishing table retainer through a planetary gear mechanism; and a chuck mounting section fixedly secured to the planetary gear mechanism box, wherein the chuck mounting section includes a chuck that allows a ferrule to be guided with respect to the polishing table for a sliding capability in a vertical direction, and a pressure-applying mechanism that causes the ferrule to be vertically held in pressured contact with the polishing table, wherein the drive mechanism rotates and revolves the polishing table and the polishing table retainer on a surface, opposing to an end face, to be processed, of the ferrule, and wherein the drive mechanism further includes:

a central shaft standing upright in a frame;

a sun gear fixedly secured to the central shaft;

a rotary bearing gear rotatably attached to the central shaft;

a rotary bearing unitarily formed with the rotary bearing gear;

a stationary shaft disposed on the rotary bearing;

a first planetary gear rotatably attached to the stationary shaft and meshing with the sun gear;

a second planetary gear unitarily formed with the polishing table retainer and meshing with the first planetary gear; and a second planetary gear shaft on which the second planetary gear is rotatably supported and supported on the rotary bearing via an arm;

wherein the presence of a difference in gear teeth between the sun gear and the second planetary gear allows the second planetary gear, the polishing table retainer and the polishing table to rotate and revolve about a center of the central shaft.

2. The optical connector end face machining apparatus of claim 1, wherein the chuck mounting section is fixedly secured to the planetary gear mechanism box by means of two columns.

3. The optical connector end face machining apparatus of claim 1, wherein the polishing table is made of resilient deformable material, and a polishing film is provided on a surface, opposing to the ferrule, of the polishing table.

4. The optical connector end face machining apparatus of claim 1, wherein the polishing table retainer is supported to be able to revolve and rotate on a surface, opposing to an end face, to be processed, of the ferrule through a rotating mechanism with respect to the planetary gear mechanism box.

5. An optical connector end face machining apparatus comprising:

an operation circuit box having a drive motor and a battery and serving as a grasping section;

a planetary gear mechanism box including a drive mechanism that rotatably retains a polishing table on a polishing table retainer and permits rotation from the drive motor to be delivered to the polishing table retainer through a planetary gear mechanism; and a chuck mounting section fixedly secured to the planetary gear mechanism box, wherein the chuck mounting section includes a chuck that allows a ferrule to be guided with respect to the polishing table for a sliding capability in a vertical direction, and a pressured-applying mechanism that causes the ferrule to be vertically held in pressured contact with the polishing table, wherein the drive mechanism rotates and revolves the polishing table and the polishing table retainer on a surface, opposing to an end face, to be processed, of the ferrule, and wherein the drive mechanism further includes:

a central shaft standing upright in a frame;

a sun gear fixedly secured to the central shaft;

a rotary bearing gear rotatably attached to the central shaft;

a rotary bearing unitarily formed with the rotary bearing gear;

a stationary shaft disposed on the rotary bearing;

a first planetary gear rotatably attached to the stationary shaft and meshing with the sun gear;

a second planetary gear unitarily formed with the polishing table retainer and meshing with the first planetary gear; and a second planetary gear unitarily shaft on which the second planetary gear is rotatably supported and supported on the rotary bearing via an arm;

wherein the sun gear and the second planetary gear are set to have the same gear teeth whereby the second planetary gear, the polishing table retainer and the polishing table revolve about a center of the central shaft.

6. The optical connector end face machining apparatus of claims 1 or 5, wherein a compression spring is disposed between the second planetary gear shaft and the polishing table retainer for urging the polishing table toward the rotating mechanism.

7. The optical connector end face machining apparatus of claims 1 or 5, wherein the pressure-applying mechanism includes a guide hook in which a flange of the ferrule is fixedly secured to a guide shaft standing upright in the chuck section, a pressure adjusting screw is disposed on an upper end of the guide shaft in which a compression spring is compressed between the pressure adjusting screw and the guide hook.

8. A method of machining an end face of an optical connector formed of a cylindrical ferrule with a diameter of approximately 1.25 mm or 2.5 mm or with a diameter in proportionate thereto, the method comprising:

bonding step applying an adhesive to a circumferential periphery of a fiber at an area except for an end face to be processed and permitting the fiber to be inserted to the ferrule and bonded thereto into the ferrule; cutting step cutting an excessive fiber protruding from an end face of the fiber; forming step forming a convex spherical surface on the end face of the fiber; and finishing step finishing the end face of the fiber, wherein the cutting step, forming step and finishing step are carried out with the optical connector end face machining apparatus defined in claims 1 or 5.

9. The optical connector end face machining apparatus of claims 1 or 5, wherein a counter-weight is disposed on the rotary bearing.

10. The optical connector end face machining apparatus of claim 1, wherein a distance between an axis of a central shaft and an axis of the second planetary gear shaft is equal to a radius of a revolving motion of the polishing table.

11. The optical connector end face machining apparatus of claim 1, wherein a magnet is disposed on a surface opposing to the polishing table retainer of the polishing table, and the polishing table retainer is made of metal.

12. The optical connector end face machining apparatus of claim 1, wherein the polishing table retainer includes a pin fixedly secured to the polishing table retainer and standing upright toward a direction opposing the polishing table, the pin is configured to engage with an engaging portion formed on a surface opposing to the polishing table retainer of the polishing table.

* * * * *